(12) United States Patent
Zeng et al.

(10) Patent No.: US 7,747,618 B2
(45) Date of Patent: Jun. 29, 2010

(54) AUGMENTING USER, QUERY, AND DOCUMENT TRIPLETS USING SINGULAR VALUE DECOMPOSITION

(75) Inventors: Hua-Jun Zeng, Beijing (CN); Jian-Tao Sun, Beijing (CN); Wei-Ying Ma, Beijing (CN); Zheng Chen, Beijing (CN); Benyu Zhang, Beijing (CN); Huan Liu, Tempe, AZ (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 11/222,243

(22) Filed: Sep. 8, 2005

(65) Prior Publication Data

US 2007/0055646 A1 Mar. 8, 2007

(51) Int. Cl.
G06F 7/00 (2006.01)
(52) U.S. Cl. .................................................. 707/732
(58) Field of Classification Search .................. None
See application file for complete search history.

(56) References Cited

U.S. PATENT DOCUMENTS

| | | | | |
|---|---|---|---|---|
| 4,839,853 | A * | 6/1989 | Deerwester et al. | 707/5 |
| 6,026,388 | A * | 2/2000 | Liddy et al. | 707/1 |
| 6,678,690 | B2 * | 1/2004 | Kobayashi et al. | 707/101 |
| 6,766,316 | B2 * | 7/2004 | Caudill et al. | 707/3 |
| 6,993,586 | B2 * | 1/2006 | Chen et al. | 709/228 |
| 2002/0007364 | A1 * | 1/2002 | Kobayashi et al. | 707/203 |
| 2002/0138528 | A1 * | 9/2002 | Gong et al. | 707/530 |
| 2005/0246410 | A1 | 11/2005 | Chen et al. | |
| 2006/0112068 | A1 | 5/2006 | Zhang et al. | |

OTHER PUBLICATIONS

Sun, Jian-Tao; Hua-Jun Zeng; Huan Liu; Yuchang Lu; Zheng Chen, "CubeSVD: A Novel Approach to Personalized Web Search", May 2005, ACM, pp. 382-390.*
"The PageRank Citation Ranking: Bringing Order to the Web," Jan. 29, 1998, 17 pages.
Almeida, Rodrigo B. and Virgilio A. F. Almeida, "A Community-Aware Search Engine," WWW May 17-22, 2004, New York, pp. 413-421.
Berry, Michael, Theresa Do, Gavin O'Brien, Vijay Krishna and Sowmini Varadhan, "SVDPACKC Version 1.0 User's Guide," Oct. 6, 1993, Computer Science Department, 63 pages.
Breese, John S., David Heckerman and Carl Kadie, "Empirical Analysis of Predictive Algorithms for Collaborative Filtering," Oct. 1998, Microsoft Technical Report MSR-TR-98-12, Microsoft Research, Microsoft Corporation, 21 pages.

(Continued)

*Primary Examiner*—Charles Rones
*Assistant Examiner*—Dinku W Gebresenbet
(74) *Attorney, Agent, or Firm*—Perkins Coie LLP

(57) ABSTRACT

A system for augmenting click-through data with latent information present in the click-through data for use in generating search results that are better tailored to the information needs of a user submitting a query is provided. The augmentation system creates a three-dimensional matrix with the dimensions of users, queries, and documents. The augmentation system then performs a three-order singular value decomposition of the three-dimensional matrix to generate a three-dimensional core singular value matrix and a left singular matrix for each dimension. The augmentation system finally multiplies the three-dimensional core singular value matrix by the left singular matrices to generate an augmented three-dimensional matrix that explicitly contains the information that was latent in the un-augmented three-dimensional matrix.

17 Claims, 12 Drawing Sheets

OTHER PUBLICATIONS de Lathauwer, Lieven, Bart de Moor and Joos Vandewalle, "A Multilinear Singular Value Decomposition," Jan. 4, 1999, Siam J. Matrix Anal. Appl., vol. 21, No. 4, 2000 Society for Industrial and Applied Mathematics, pp. 1253-1278.

Deerwester, Scott, Susan T. Dumais, Richard Harshman, "Indexing by Latent Semantic Analysis," Journal of the America Society for Information Science, vol. 41, 1990, 34 pages.

Fitzpatrick, Larry and Mei Dent, "Automatic Feedback Using Past Queries: Social Searching?," SIGIR'97, Philadelphia, © 1997 ACM, pp. 306-313.

Golub, Gene H. and Charles F. Van Loan, "2.5 Orthogonality and the SVD," Matrix Computations, Third Edition, The Johns Hopkins University Press, © 1996 The Johns Hopkins University Press, 12 pages.

Google Web Search Help Center, 2006 Google, http://labs.google.com/personalized, one page, [last accessed Aug. 31, 2006].

Haveliwala, Taher H., "Topic-Sensitive Page Rank," Proceedings of the International World Wide Web Conference May 7-11, 2002, Honolulu, Hawaii, 10 pages.

Herlocker, Jonathan L., Joseph A. Konstan, Al Borchers and John Riedl, "An Algorithmic Framework for Performing Collaborative Filtering," Proceedings of the 22nd Annual International ACM SIGIR Conference on Research and Development in Information Retrieval, 1999 ACM, pp. 230-237.

Husbands, Parry, Horst Simon and Chris Ding, "On the Use of Singular Value Decomposition for Text Retrieval," Dec. 2001, NERSC Division, Lawrence Berkeley National Laboratory, pp. 1-12.

Jin, Xin, Yanzan Zhou and Bamshad Mobasher, "Web Usage Mining Based on Probabilistic Latent Semantic Analysis," KDD'04, Aug. 2004, Seattle, Washington, 2004 ACM, 8 pages.

Joachims, Thorsten, "Optimizing Search Engines using Clickthrough Data," SIGKDD 2002, Edmonton, Alberta, Canada, 2002 ACM, 10 pages.

Liu, Fang, Clement Yu and Weiyi Meng, "Personalized Web Search by Mapping User Queries to Categories," CIKM'02, Nov. 4-9, 2002 ACM, McLean, Virginia, 8 pages.

Mobasher, Bamshad, Honghua Dai, Tao Luo and Miki Nakagawa, "Discovery and Evaluation of Aggregate Usage Profiles for Web Personalization," Jul. 8, 2001, dmkdkluwer.tex, 18:35, 2001 Kluwer Academic Publishers, pp. 1-26.

MyYahoo!, http://my.yahoo.com/?myhome, one page, [last accessed Aug. 31, 2006].

Pitkow, James et al., "Personalized Search," Communications of the ACM, Sep. 2002, vol. 45, No. 9, © 2002 ACM, pp. 50-55.

Popescul, Alexandrin, Lyle H. Ungar, David M. Pennock and Steve Lawrence, "Probabilistic Models for Unified Collaborative and Content-Bases Recommendation in Sparse-Data Environments," Proceedings of the 17th Conference on Uncertainty in Artificial Intelligence (UAI-2001), Morgan Kaufmann, San Francisco, 2001, pp. 437-444, 9 pages provided.

Pryor, Michael H., "The Effects of Singular Value Decomposition on Collaborative Filtering," Jun. 1998, Computer Science Technical Report, Dartmouth College, PCS-TR98-338, pp. 1-43.

Sarwar, Badrul, George Karypis, Joseph A. Konstan and John T. Riedl, "Application of Dimensionality Reduction in Recommender System—A Case Study," GroupLens Research Group / Army HPC Research Center, Department of Computer Science and Engineering, University of Minnesota, 2000, 12 pages.

Smith, Lindsay I., "A tutorial on Principal Components Analysis," Feb. 26, 2002, 27 pages.

Srebro, Nathan and Tommi Jaakkola, "Weighted Low-Rank Approximations," Proceedings of the 20th International Conference on Machine Learning (ICML-2003), Washington DC, 2003, 8 pages.

Sugiyama, Kazunari, Kenji Hatano and Masatoshi Yoshikawa, "Adaptive Web Search Based on User Profile Constructed without Any Effort from Users," 13th International World Wide Web Conference, 2004, New York, ACM, pp. 675-684.

Vasilescu, M. Alex O. and Demetri Terzopoulos, "Multilinear Image Analysis for Facial Recognition," Proceedings of the International Conference on Pattern Recognition (ICPR'02), Quebec City, Canada, Aug. 2002, 4 pages.

Wang, Jidong, Huajun Zeng, Zheng Chen, Hongjun Lu, Li Tao and Wei-Ying Ma, "ReCoM: Reinforcement Clustering of Multi-Type Interrelated Data Objects," 26th International ACM SIGIR Conference 2003, Toronto, Canada, 2003 ACM, 8 pages.

* cited by examiner

AUGMENTING USER, QUERY, AND DOCUMENT TRIPLETS USING SINGULAR VALUE DECOMPOSITION

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking determined by their relevance.

Two well-known techniques for ranking web pages are PageRank and HITS ("Hyperlinked-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the result as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q)$$

and $$h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

These web page ranking techniques base their rankings primarily on attributes of the web pages themselves. These web page ranking techniques, however, do not take into consideration the attributes of the user submitting the query. For example, a zoologist who submits the query "jaguar" would get the same results as a car enthusiast who submits the same query. In such a case, the zoologist may be interested in web pages related to animals, whereas the car enthusiast may be interested in web pages related to automobiles.

Personalized web search techniques have been developed to adapt search results to the individual user's interests. A personalized web search technique attempts to provide a distinct search engine for each user by constructing a personal profile manually or automatically. The technique adapts the search results to the user who submitted the query based on their personal profile. A disadvantage of this technique, however, is that it is difficult to construct accurate personal profiles. Manual collection is difficult because most users are reluctant to provide their personal information manually, and automatic collection is difficult because it requires a large amount of user history data. Moreover, it is not clear whether complex user behavior can be accurately modeled by a personal profile.

SUMMARY

A method and system for augmenting click-through data with latent information present in the click-through data for use in generating search results that are better tailored to the information needs of the user submitting the query is provided. The augmentation system analyzes click-through data to generate user, query, and document triplets ("click-through triplets") indicating that the user submitted the query and that the user selected the document from the results of the query. The augmentation system creates a three-dimensional matrix with the dimensions of users, queries, and documents. The augmentation system may set the initial values of the matrix to indicate the number of triplets of the click-through data corresponding to that user, query, and document. The augmentation system then performs a three-order singular value decomposition of the three-dimensional matrix to generate a three-dimensional core singular value matrix and a left singular matrix for each dimension. The augmentation system finally multiplies the three-dimensional core singular value matrix by the left singular matrices to generate an augmented three-dimensional matrix that explicitly contains the information that was latent in the un-augmented three-dimensional matrix.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
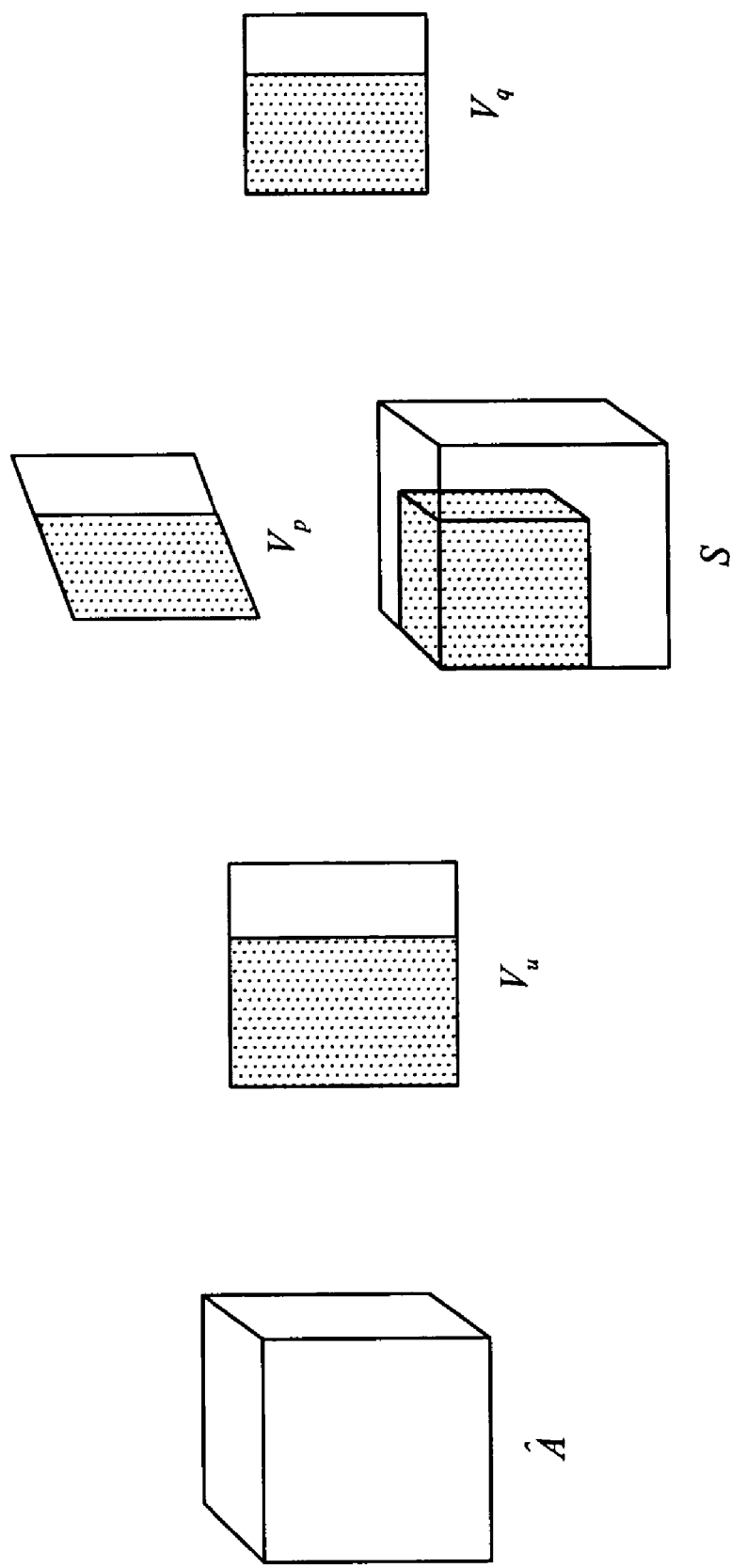
FIG. 1 is a diagram that provides a visualization of three-order singular value decomposition.

A method and system for augmenting click-through data with latent information present in the click-through data for use in generating search results that are better tailored to the information needs of the user submitting the query is provided. In one embodiment, an augmentation system analyzes click-through data to generate user, query, and document triplets ("click-through triplets") indicating that the user submitted the query and that the user selected the document from the results of the query. Many search engine services maintain server-side click-through data of the queries submitted by users, the query results, and the documents of the query results that the users selected. The click-through data, however, is typically both very large in size and very sparse. The click-through data is very large in the sense that a typical click-through log file may have millions of new entries added every day. The click-through data is very sparse in the sense that, of the millions of possible combinations of users, queries, and documents, triplets can only be generated for a relatively small number of these combinations from the click-through data. To overcome difficulties associated with the size and sparseness of the click-through data, the augmentation system creates a three-dimensional matrix with the dimensions of users, queries, and documents. The augmentation system sets the initial values of the matrix to indicate the number of the click-through triplets corresponding to that user, query, and document. The augmentation system then performs a three-order singular value decomposition of the three-dimensional matrix. The augmentation system performs the three-order singular value decomposition by first unfolding the three-dimensional matrix in each of its three dimensions to generate three two-dimensional matrices. The augmentation system then performs a two-order singular value decomposition for each unfolded matrix to generate a left singular matrix, singular values, and a right singular matrix. The augmentation system reduces the dimensions of the left singular matrices based on analysis of the singular values. The augmentation system then multiplies the three-dimensional matrix by the reduced left singular matrices to generate a three-dimensional core singular value matrix. The augmentation system finally multiplies the three-dimensional core singular value matrix by the non-reduced left singular matrices to generate an augmented three-dimensional matrix that explicitly contains the information that was latent in the un-augmented three-dimensional matrix. A web search engine service can then use the augmented three-dimensional matrix of click-through data to identify documents (e.g., web pages) that are relevant to the queries submitted by a user. In this way, the augmentation system allows the latent information of sparse click-through triplets to be used when searching for documents.

The algorithm used by the augmentation system in one embodiment is described by the following steps:

1. Generate three-order tensor $A \in R^{m \times n \times k}$ where m represents the number of users, n represents the number of queries, and k represents the documents (e.g., web pages) of the click-through data and set the values to the count of triplets for each combination of user, query, and document. (Note: A three-order tensor is also referred to as a three-dimensional matrix.)

2. Generate unfolded matrices $A_u$, $A_q$, and $A_p$ from tensor A. Tensor A is unfolded in the user dimension to generate $A_u$ whose column vector is achieved by varying the user index of tensor A while keeping the query and page indices fixed. $A_q$ and $A_p$ are generated in a similar way. Thus, $A_u$, $A_q$, and $A_p$ are two-dimensional matrices of m×nk, n×mk, and k×mn, respectively.

3. Perform two-order singular value decomposition ("SVD") on each unfolded matrix $A_u$, $A_q$, and $A_p$ to generate left singular matrices represented by $V_u$, $V_q$, and $V_p$. A reduced dimension is then selected for each left singular matrix where $m_0$, $n_0$, and $k_0$ represent the reduced dimensions of the user, query, and document left singular matrices, respectively. The reduced dimensions may be selected based on analysis of the singular values of each SVD. The reduced left singular matrices contain the left-most $m_0$, $n_0$, and $k_0$ columns of $V_u$, $V_q$, and $V_p$ and are represented by $W_u$, $W_q$, and $W_p$, respectively.

4. Compute the core tensor using the following equation:

$$S = A \times_1 W_u' \times_2 W_q' \times_3 W_p' \quad (1)$$

where S is the core tensor, W' is the transpose of W, and $\times_n$ is the n-mode of matrix and tensor.

5. Construct the augmented three-order tensor using the following equation:

$$\hat{A} = S \times_1 V_u \times_2 V_q \times_3 V_p \quad (2)$$

where $\hat{A}$ represents the augmented three-order tensor where each value indicates the relevance of document p to query q when submitted by user u.

FIG. 1 is a diagram that provides a visualization of three-order singular value decomposition. The shaded regions of $V_u$, $V_q$, and $V_p$ correspond to $W_u$, $W_q$, and $W_p$. The augmented tensor $\hat{A}$ is represented as the product of the core tensor S and the three dimension-reduced singular matrices $W_u$, $W_q$, and $W_p$.

Figure 2:
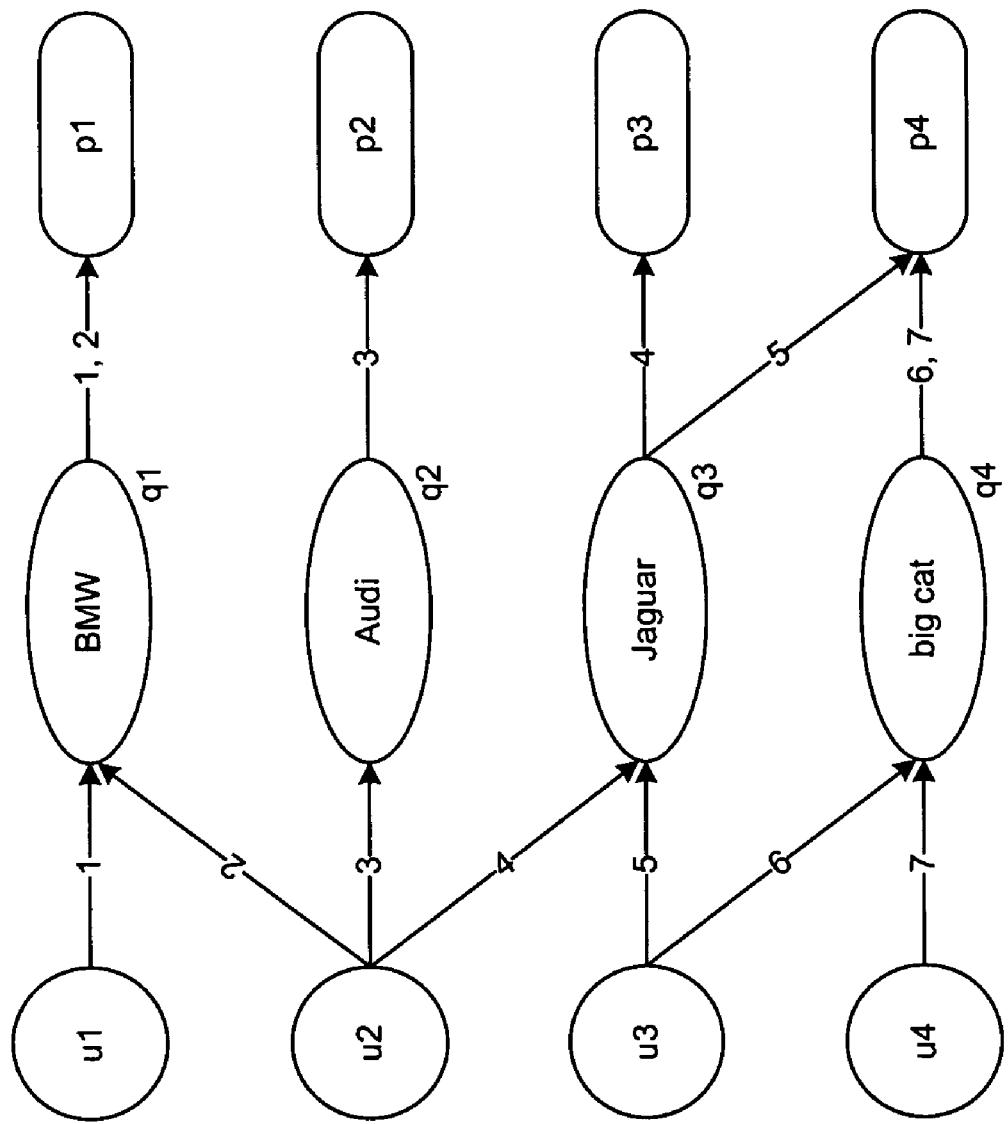
FIG. 2 is a block diagram that illustrates example triplet data.

FIG. 2 is a block diagram that illustrates example click-through triplets. In this example, there are four users ($u_1 \ldots u_4$), four queries ($q_1 \ldots q_4$), and four documents ($p_1 \ldots p_4$). The queries are "bmw," "audi," "jaguar," and "big cat." The lines between the users and the queries indicate that the user submitted that query, and the lines between the queries and the documents indicate that the user selected that document from the query. For example, the line between $u_2$ and jaguar indicates that the second user submitted a jaguar query, and the line between the $q_3$ and $p_3$ indicates that the second user selected the third document from the jaguar query. Table 1 illustrates the URLs and titles of pages visited in this sample.

TABLE 1

| Page | URL | Title |
| --- | --- | --- |
| $p_1$ | http://www.bmw.com | BMW International Website |
| $p_2$ | http://www.audiusa.com | Audiusa.com Home Page |
| $p_3$ | http://www.jaguarusa.com/us/en/home.htm | Jaguar Cars |
| $p_4$ | http://dspace.dial.pipex.com/agarman/bco/ver4.htm | Big Cats Online Home |

From Table 1, it can be seen that $p_1$, $p_2$, and $p_3$ are web pages relating to cars and $p_4$ is a web page relating to cats. From FIG. 2, it can be seen that $u_1$ and $u_2$ have interests in cars and $u_3$ and $u_4$ have interests in cats. In this example, it is assumed that each user submits a query and then selects each web page only once. Given this assumption, Table 2 illustrates the click-through triplets with the weight column indicating that each web page was only selected once.

TABLE 2

| Arrow Line | User | Query | Page | Weight |
| --- | --- | --- | --- | --- |
| 1 | $u_1$ | $q_1$ | $p_1$ | 1 |
| 2 | $u_2$ | $q_1$ | $p_1$ | 1 |
| 3 | $u_2$ | $q_2$ | $p_2$ | 1 |
| 4 | $u_2$ | $q_3$ | $p_3$ | 1 |
| 5 | $u_3$ | $q_3$ | $p_4$ | 1 |
| 6 | $u_3$ | $q_4$ | $p_4$ | 1 |
| 7 | $u_4$ | $q_4$ | $p_4$ | 1 |

The augmentation system generates the un-augmented three-order tensor from the triplets of Table 2 with all the other combinations (i.e., 64 total) of user, query, and document values of zero. Table 3 illustrates the triplets of the augmented three-order tensor with non-zero values.

TABLE 3

| Arrow Line | User | Query | Page | Weight |
| --- | --- | --- | --- | --- |
| 1 | $u_1$ | $q_1$ | $p_1$ | 0.5 |
| 2 | $u_2$ | $q_1$ | $p_1$ | 1.207 |
| 3 | $u_2$ | $q_2$ | $p_2$ | 0.853 |
| 4 | $u_2$ | $q_3$ | $p_3$ | 0.853 |
| 5 | $u_3$ | $q_3$ | $p_4$ | 0.723 |
| 6 | $u_3$ | $q_4$ | $p_4$ | 1.171 |
| 7 | $u_4$ | $q_4$ | $p_4$ | 0.723 |
| 8 | $u_1$ | $q_2$ | $p_2$ | 0.354 |
| 9 | $u_1$ | $q_3$ | $p_3$ | 0.354 |
| 10 | $u_4$ | $q_3$ | $p_4$ | 0.447 |

Figure 3:
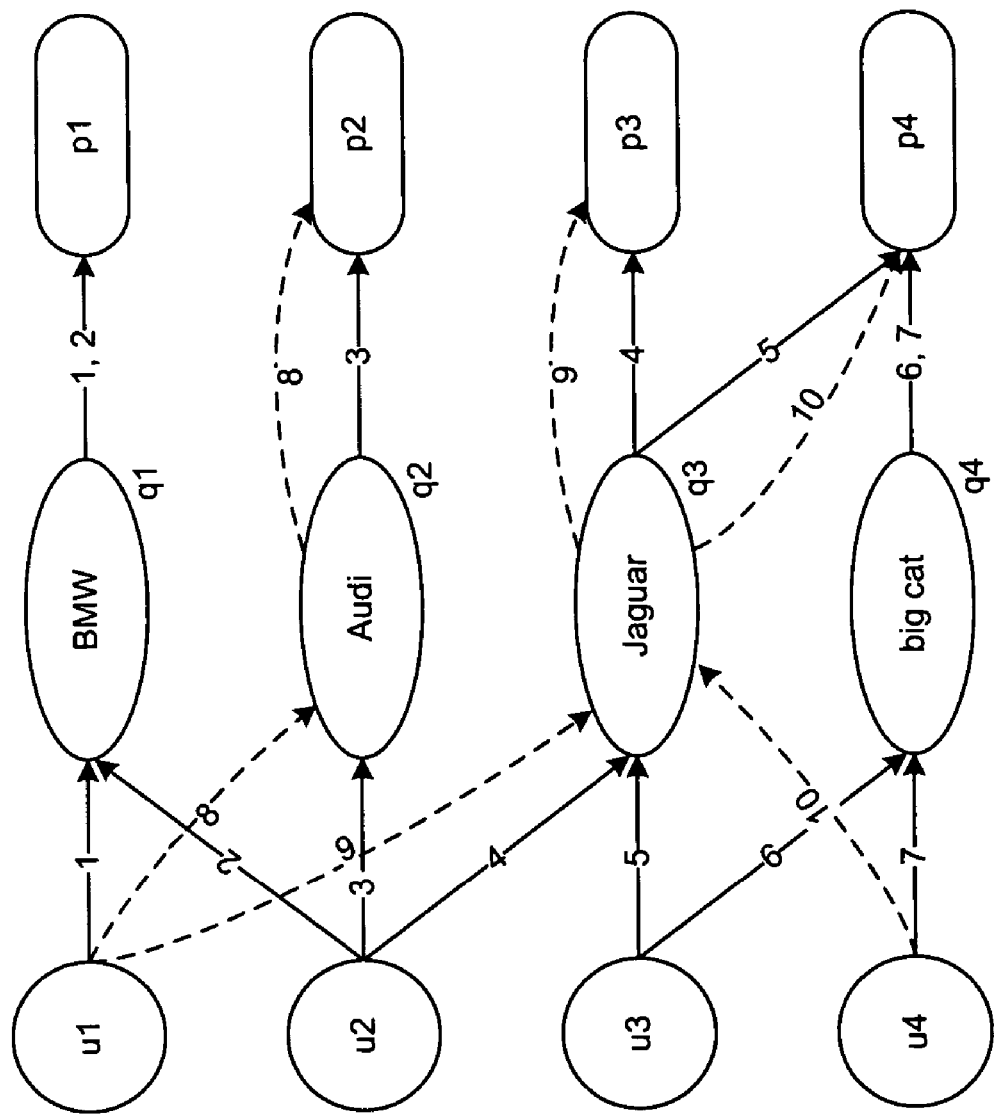
FIG. 3 is a block diagram that illustrates the augmented tensor.

Table 3 indicates that the weights for the original triplets have been adjusted based on latent information to more accurately reflect relevance and weights of the original triplets. FIG. 3 is a block diagram that illustrates the augmented tensor. The dashed lines of FIG. 3 illustrate the new triplets. From the original click-through data, it can be seen that neither $u_1$ nor $u_4$ submitted $q_3$. However, there is no explicit information indicating which page is relevant if $u_1$ or $u_4$ submits $q_3$ because $q_3$ is ambiguous in the sense that the explicit information for $q_3$ indicates that it could be submitted by users looking for cars or cats. Table 3 indicates that when $u_1$ submits $q_3$, then $p_3$ has a revelance of 0.354 all other web pages have a relevance of 0. Similarly, Table 3 also indicates that when $u_4$ submits $q_3$, then $p_4$ has a relevance of 0.447 and all other web pages have a relevance of 0. Thus, based on Table 3, $u_1$ would be provided with $p_3$ relating to cars and $u_4$ would be provided with $p_4$ relating to cats when they submit $q_3$. Thus, the latent information that is made explicit is consistent with the observation that $u_1$ had previously visited only web pages relating to cars and $u_4$ had previously visited only web pages relating to cats.

In one embodiment, the augmentation system applies a weighting policy to the values of the un-augmented three-dimensional matrix. If the values of the matrix are based directly on click-through frequency, the results would be biased towards high values. The augmentation system may apply a Boolean policy, a log frequency policy, or a log inverse document frequency policy for the weighting. The Boolean policy sets each value with a non-zero frequency to 1 and all other values to zero. The log frequency policy sets each value as represented by the following equation:

$$f' = \log_2(1+f) \quad (3)$$

where f' represents the new value and f represents the original value. The log function helps reduce the impact of high-frequency visits. The log inverse document frequency policy sets each value as represented by the following equation:

$$f' = \log_2(1+f/f_0) \quad (4)$$

where $f_0$ represents the inverse document frequency ("IDF") that represents the frequency with which a document is visited by different users.

In one embodiment, the augmentation system provides a smoothing policy to help reduce the sparseness of the un-augmented three-dimensional matrix. If the matrix is too sparse, then the latent information may be difficult to capture. The augmentation system may use a constant policy or a document similarity policy. The constant policy assigns a non-zero weight to each document not visited by a user for each query submitted by the user to reflect a small probability that the user may have selected that document after submitting the query. The document similarity policy assigns a weight to non-visited documents based on the similarity of their content to the content of the visited documents. For each user and query pair u and q, the visited documents are represented by $S_1$ and the non-visited documents are represented by $S_2$. Each document is represented by a vector of terms (or words) indicating the weight of each term within the document. The augmentation system represents the similarity between a non-visited document p and the visited documents $S_1$ by the following equation:

$$sim(p, S_1) = \frac{1}{|S_1| \sum_{a \in S_1 S} (p, a)}, \ p \in S_2 \quad (5)$$

where $sim(p,S_1)$ represents the similarity and $_s(p,a)$ represents the similarity between document p and a document a (e.g., cosine similarity) and is represented by the following equation:

$$s(p, a) = \frac{\sum_j w_{p_j} \cdot w_{a_j}}{\|w_p\| \cdot \|w_a\|} \quad (6)$$

where $w_{p_j}$ represents the weight of term j on document p.

In one embodiment, the augmentation system applies a normalization policy to the un-augmented three-dimensional matrix to ensure that the values in one dimension sum to 1. The augmentation system may normalize in the user, query, or document dimension. If normalized in the user dimension, then the normalization is represented by the following equation:

$$\sum_{1 \le i_q \le n} \sum_{1 \le i_p \le k} a_{i_u i_q i_p} = 1 \quad (7)$$

In one analysis, empirical evidence indicates that normalization in the query dimension produces better results than normalization in either the user or document dimensions. In one embodiment, the augmentation system applies multiple policies to the un-augmented three-dimensional matrix in the following order: weighting policy, smoothing policy, and normalization policy.

Figure 4:
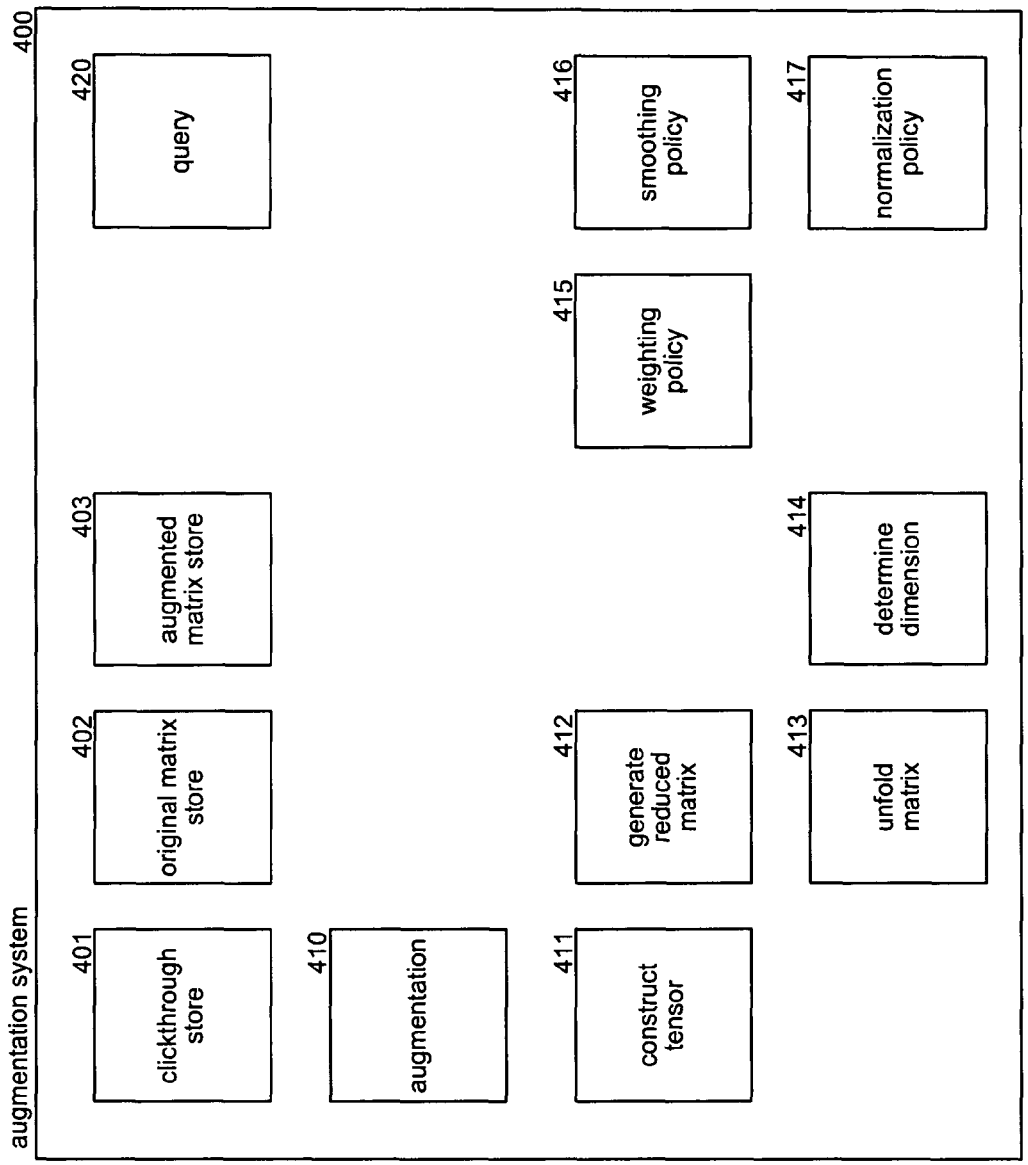
FIG. 4 is a block diagram that illustrates components of the augmentation system in one embodiment.

FIG. 4 is a block diagram that illustrates components of the augmentation system in one embodiment. The augmentation system 400 includes a click-through store 401, an original matrix store 402, and an augmented matrix store 403. The click-through store contains the click-through data from which the click-through triplets are generated. The original matrix store contains a three-dimensional matrix with the dimensions of user, query, and document that contains the initial weights that may have a weighting policy, smoothing policy, or normalization policy applied. The augmented matrix store contains the augmented three-dimensional matrix generated performing the three-order singular value decomposition on the data of the original matrix store. The augmentation system also includes an augmentation component 410 that invokes a construct tensor component 411, a generate reduced matrix component 412, an unfold matrix component 413, and a determine dimension component 414 to generate the augmented three-dimensional matrix. The augmentation system also includes a weighting policy component 415, a smoothing policy component 416, and a normalization policy component 417 that implement their corresponding policies. The augmentation system may be used in conjunction with a query component 420 of a search engine that receives user queries, retrieves the results of the queries, and ranks the results based on the information of the augmented three-dimensional matrix.

The computing device on which the augmentation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the augmentation system. In addition, the data structures and message structures may be stored or transmitted via a data transmission medium, such as a signal on a communications link. Various communications links may be used, such as the Internet, a local area network, a wide area network, or a point-to-point dial-up connection.

The augmentation system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The augmentation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
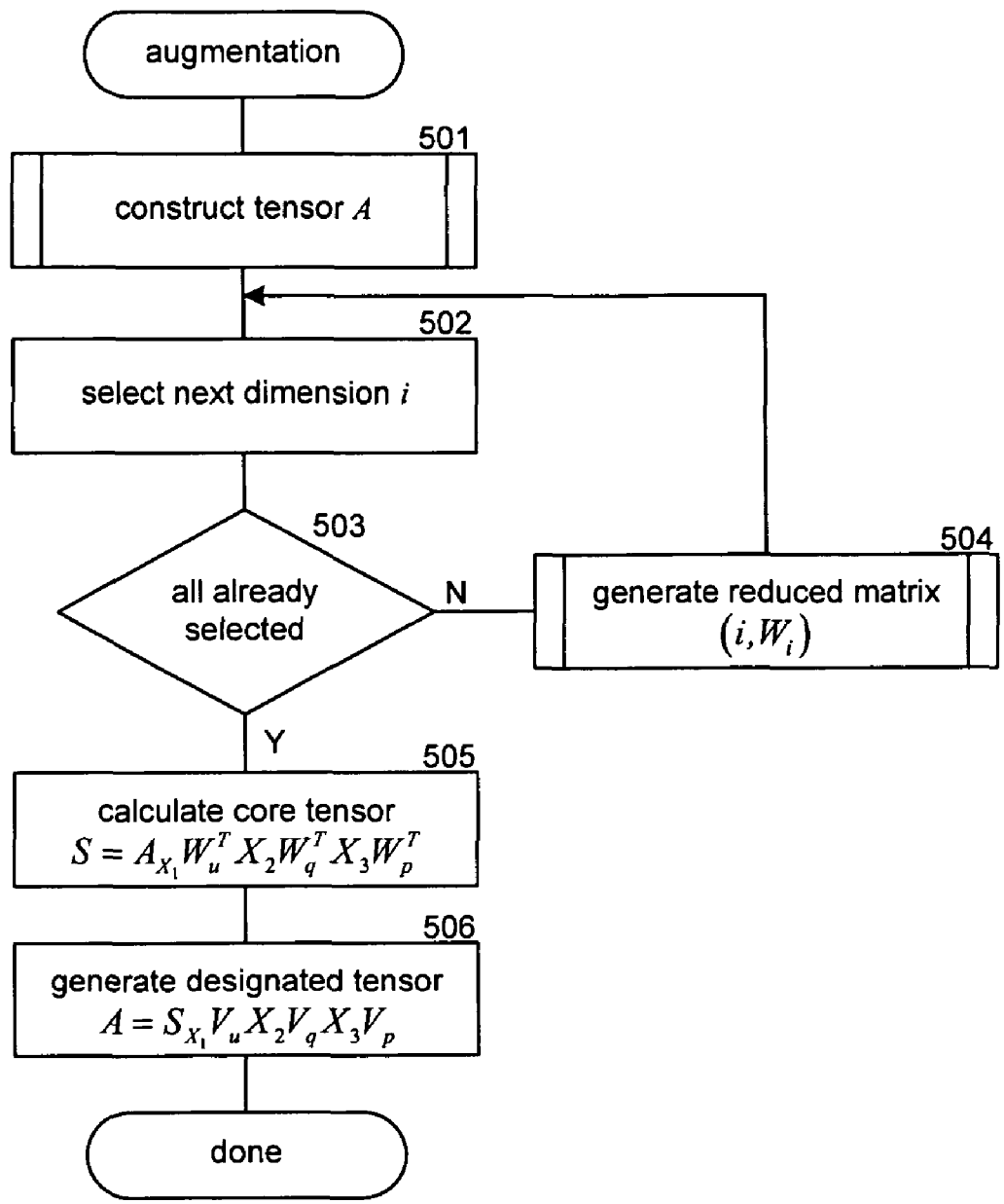
FIG. 5 is a flow diagram that illustrates the processing of the augmentation component in one embodiment.

FIG. 5 is a flow diagram that illustrates the processing of the augmentation component in one embodiment. The component constructs the original three-dimensional matrix, generates the reduced matrices for the users, queries, and documents, and then generates the augmented three-dimensional matrix. In block 501, the component invokes the construct tensor component to construct the original three-dimensional matrix from the click-through triplets. In blocks 502-504, the component loops generating the reduced matrix for each dimension. In block 502, the component selects the next dimension. In decision block 503, if all the dimensions have already been selected, then the component continues at block 505, else the component continues at block 504. In block 504, the component invokes the generate reduced matrix component to generate the reduced left singular matrix for the selected dimension and then loops to block 502 to select the next dimension. In block 505, the component calculates the core tensor from the reduced matrices and the original tensor. In block 506, the component generates the augmented tensor from the core tensor and the original left singular matrices and then completes.

Figure 6:
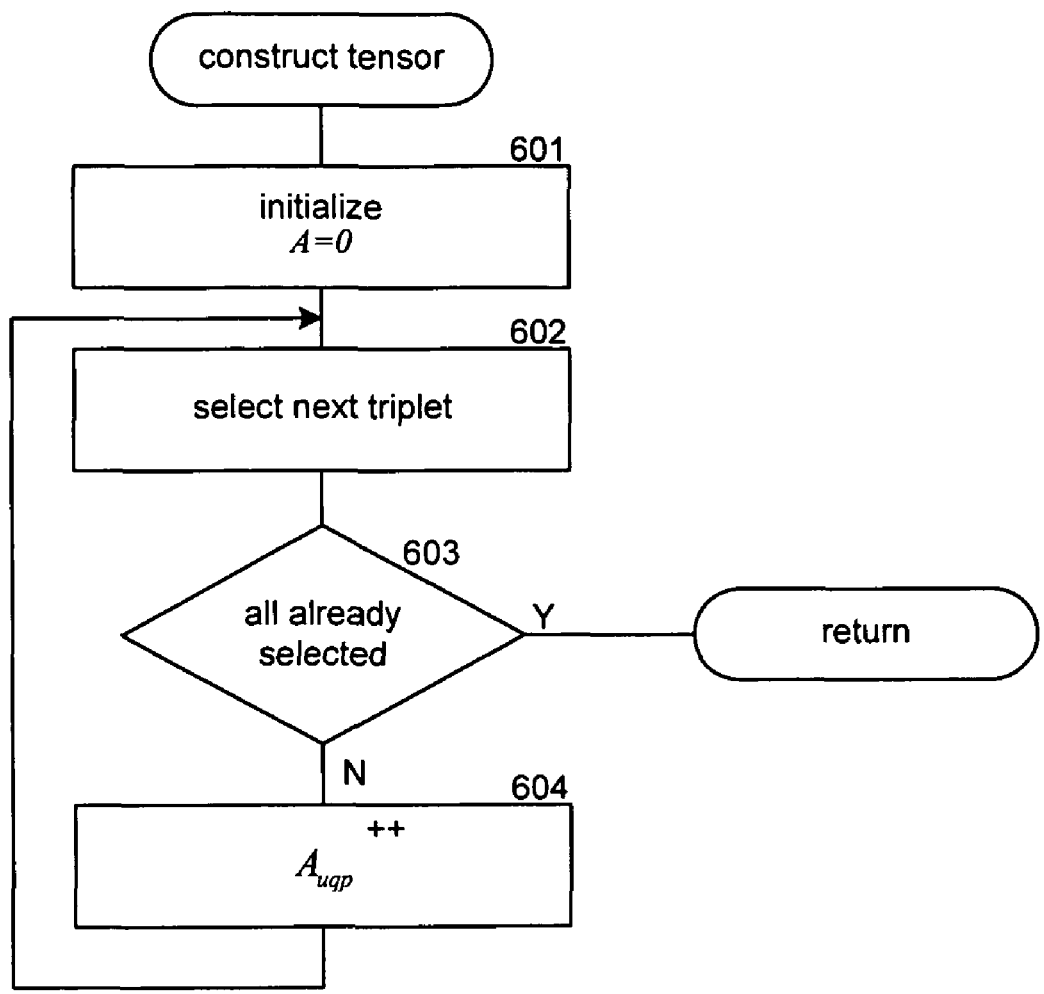
FIG. 6 is a flow diagram that illustrates the processing of the construct tensor component in one embodiment.

FIG. 6 is a flow diagram that illustrates the processing of the construct tensor component in one embodiment. In block 601, the component initializes the weights of each value of the tensor to zero. In blocks 602-604, the component loops processing the click-through triplets derived from the click-through data. In block 602, the component selects the next triplet represented in the click-through data. In decision block 603, if all the triplets have already been selected, then the component returns, else the component continues at block 604. In block 604, the component increments the weight associated with the selected triplet and then loops to block 602 to select the next triplet. Before returning, the component may also apply a weighting policy, a smoothing policy, and a normalization policy to the tensor.

Figure 7:
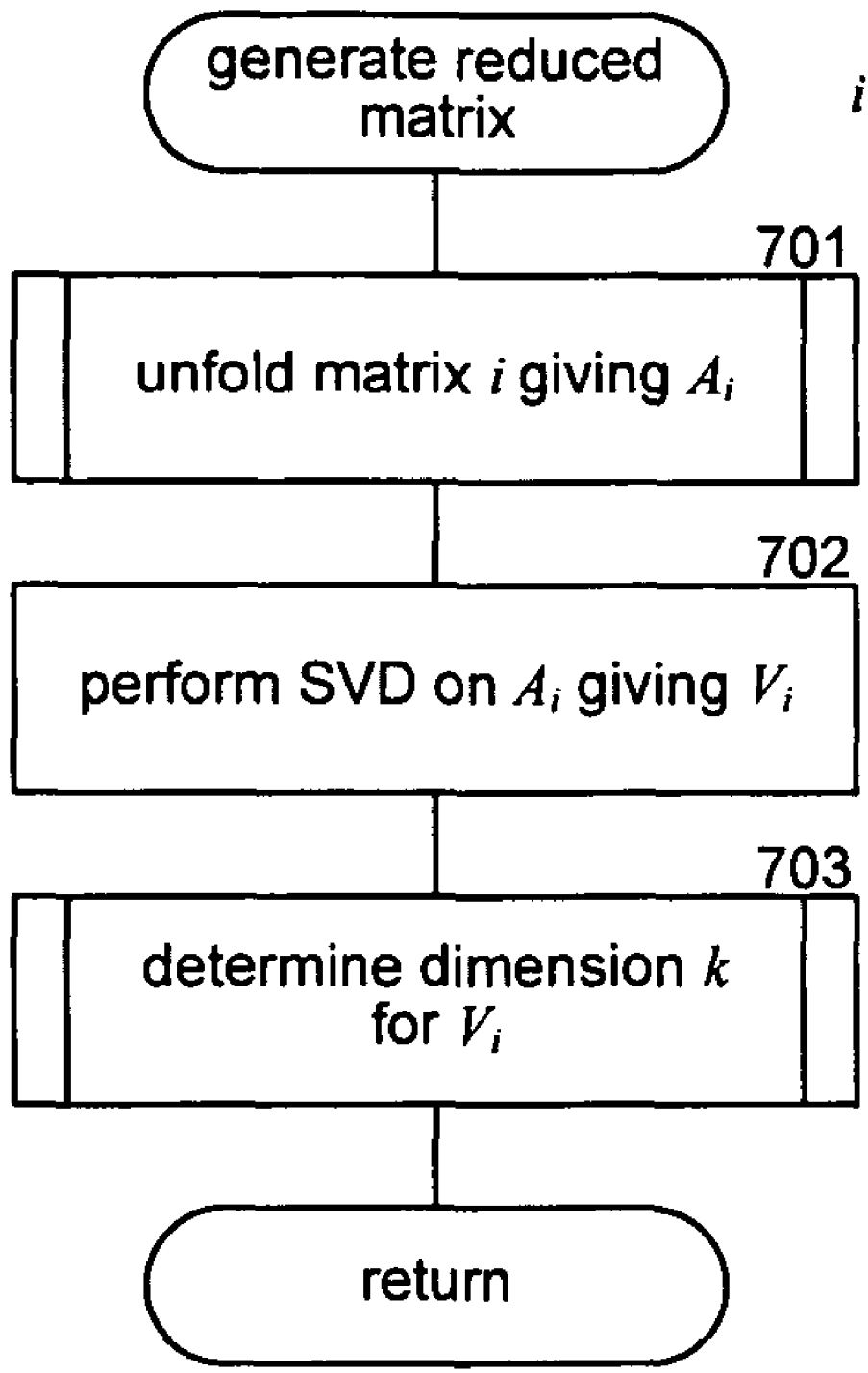
FIG. 7 is a flow diagram that illustrates the processing of the generate reduced matrix component in one embodiment.

FIG. 7 is a flow diagram that illustrates the processing of the generate reduced matrix component in one embodiment. The component is passed a dimension and generates the reduced left singular matrix for that dimension. In block 701, the component invokes the unfold matrix component passing the dimension. In block 702, the component performs two-order singular value decomposition on the unfolded matrix to generate the left singular matrix. In block 703, the component invokes the determine dimension component passing the results of the singular value decomposition. The component then returns the reduced left singular matrix.

Figure 8:
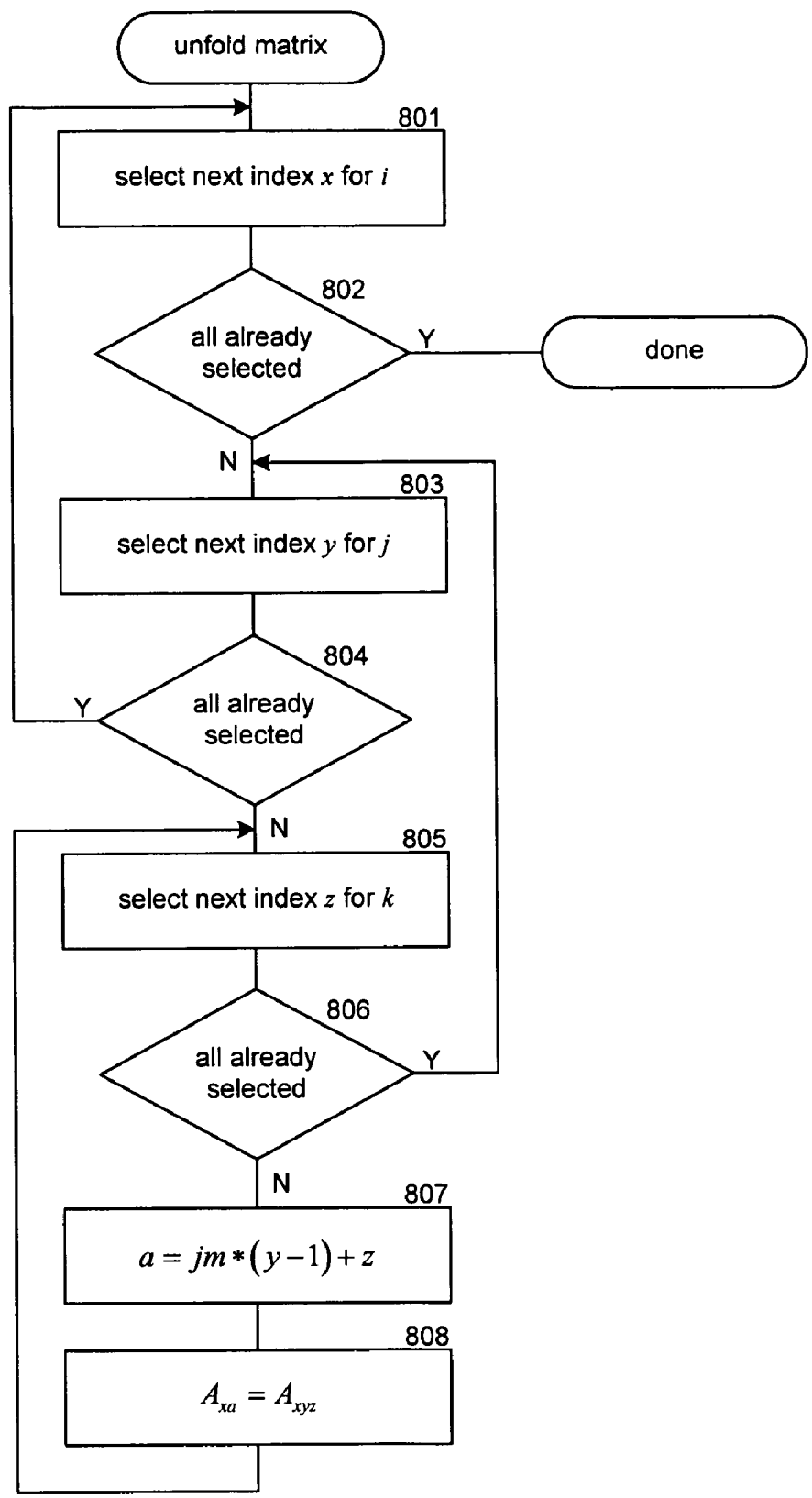
FIG. 8 is a flow diagram that illustrates the processing of the unfold matrix in one embodiment.

FIG. 8 is a flow diagram that illustrates the processing of the unfold matrix in one embodiment. The component is passed a dimension and generates an unfolded matrix in that dimension. In blocks 801-808, the component loops selecting each index of the dimension and setting the weight for each pair of the other two dimensions. In block 801, the component selects the next index of the passed dimension. In decision block 802, if all the indexes have already been selected, then the component returns, else the component continues at block 803. In blocks 803-808, the component loops selecting each pair of the other two dimensions. In block 803, the component selects the next index for the first other dimension. In decision block 804, if all those indexes have already been selected, then the component loops to block 801 to select the next index for the passed dimension, else the component continues at block 805. In block 805, the component selects the next index for the second other dimension. In decision block 806, if all those indexes have already been selected, then the component loops to block 803 to select the next index for the first other dimension, else the component continues at block 807. In block 807, the component sets the second index for the unfolded matrix with the first index being the index of the passed dimension. In block 808, the component sets the indexed value of the unfolded matrix to the indexed value of the three-dimensional matrix. The component then loops to block 805 to select the next index of the second other dimension.

Figure 9:
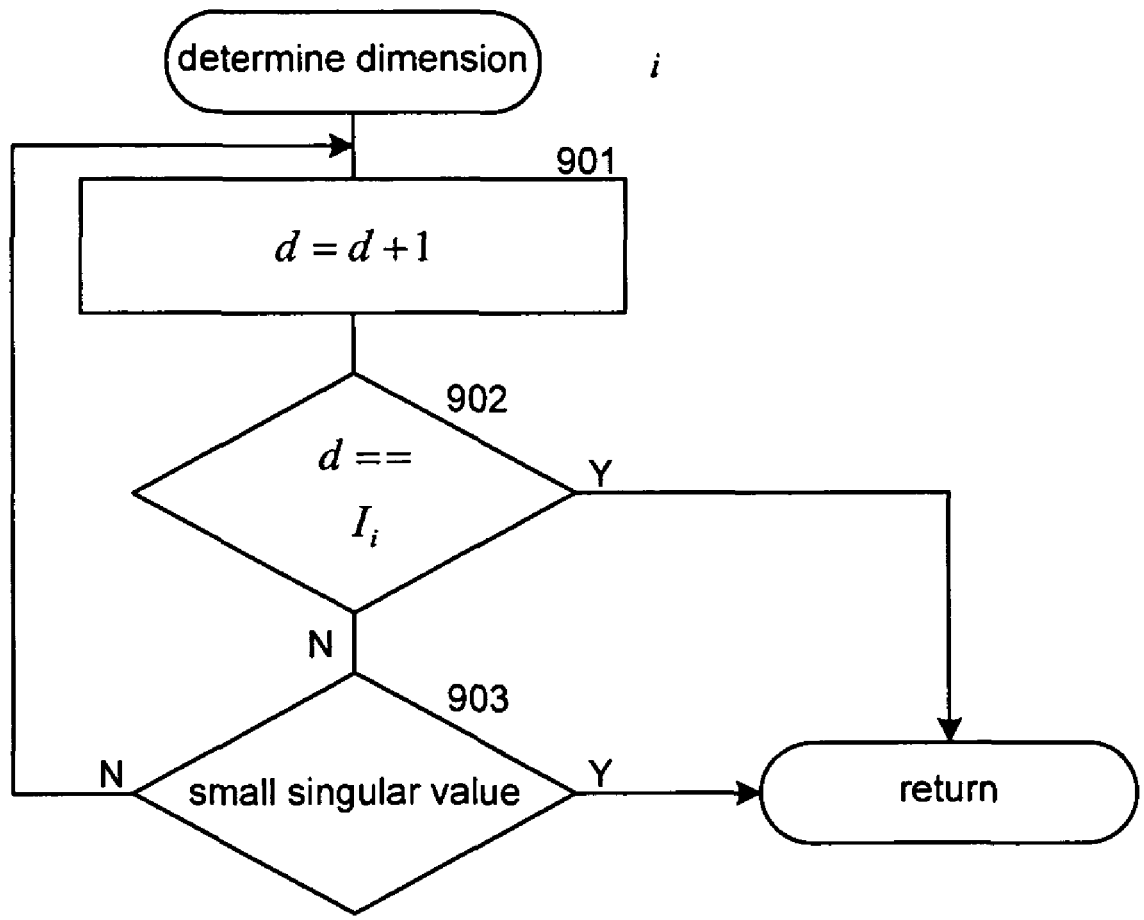
FIG. 9 is a flow diagram that illustrates the processing of the determine dimension component in one embodiment.

FIG. 9 is a flow diagram that illustrates the processing of the determine dimension component in one embodiment. The component is passed a dimension and analyzes the singular values for that dimension from the two-order singular value decomposition to determine the reduced dimension. The singular values are in a monotonically decreasing order. In block 901, the component selects the next index starting with the first. In decision block 902, if the index is less than the maximum index of the passed dimension, then the component returns, else the component continues at block 903. In decision block 903, if the singular value of the next index is too small compared to the singular value of the selected index, then the component returns the selected index as a dimension, else the component loops to block 901 to select the next index.

Figure 10:
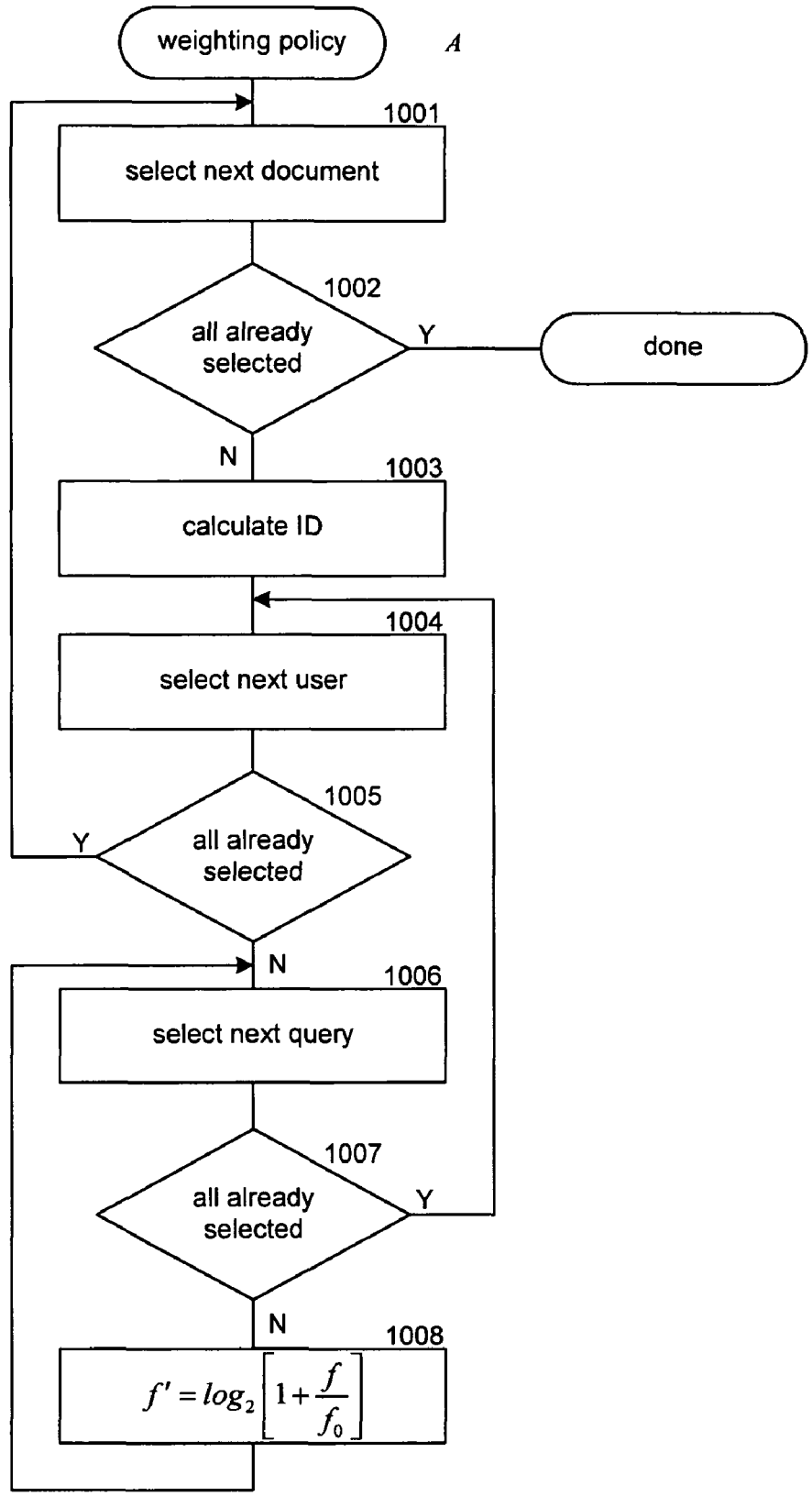
FIG. 10 is a flow diagram that illustrates the processing of the weighting policy component in one embodiment.

FIG. 10 is a flow diagram that illustrates the processing of the weighting policy component in one embodiment. This component implements the log inverse document frequency policy. In block 1001, the component selects the next document of the three-dimensional matrix. In decision block 1002, if all the documents have already been selected, then the component completes, else the component continues at block 1003. In block 1003, the component calculates the inverse document frequency for the selected document. In blocks 1004-1008, the component loops selecting each user and query pair of the three-dimensional matrix and resets its weight based on the inverse document frequency. In block 1004, the component selects the next user. In decision block 1005, if all the users have already been selected, then the component loops to block 1001 to select the next document, else the component continues at block 1006. In block 1006, the component selects the next query. In decision block 1007, if all the queries have already been selected, then the component loops to block 1004 to select the next user, else the component continues at block 1008. In block 1008, the component resets the weight for the selected user, query, and document. The component then loops to block 1006 to select the next query.

Figure 11:
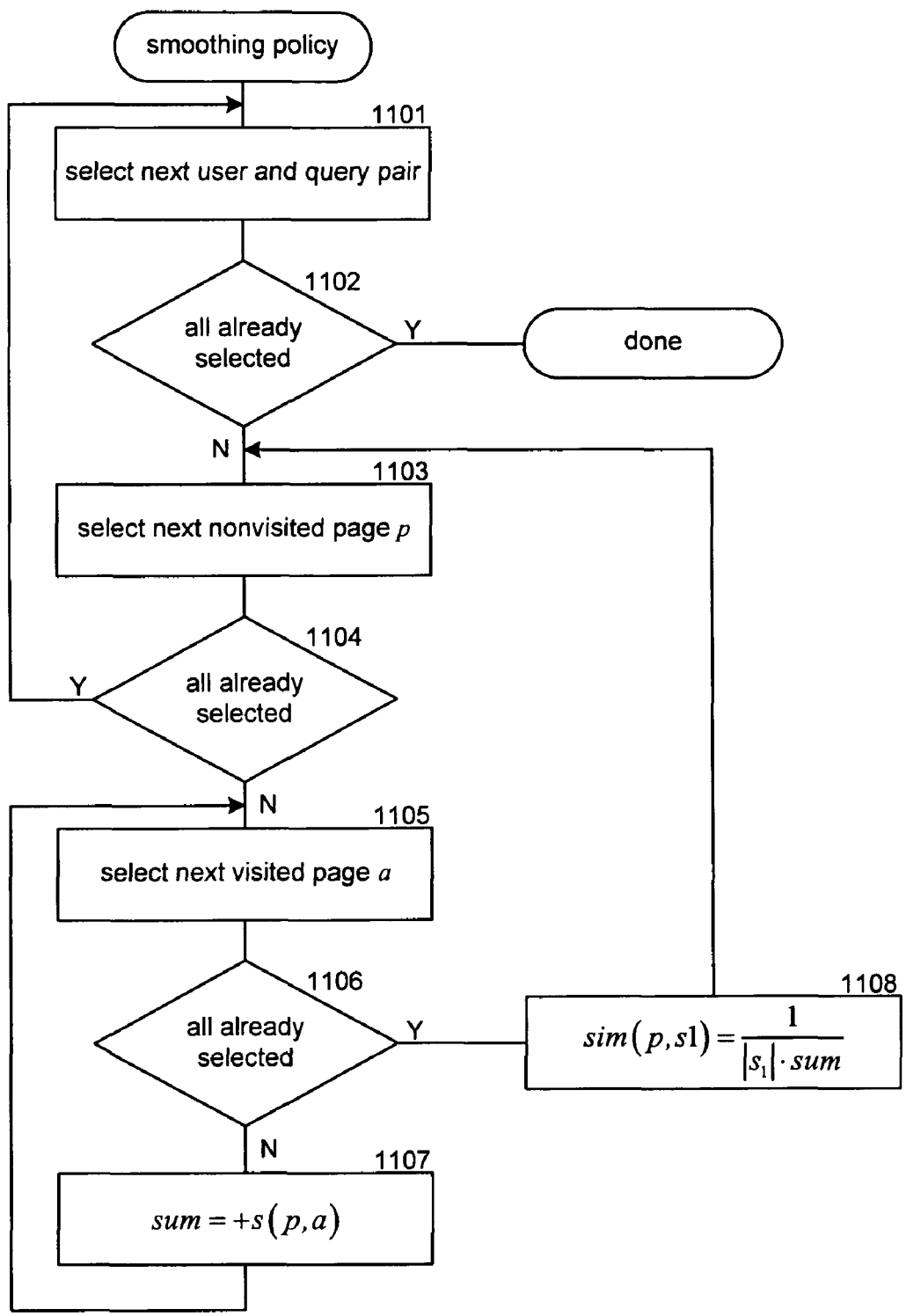
FIG. 11 is a flow diagram that illustrates the processing of the smoothing policy component in one embodiment.

FIG. 11 is a flow diagram that illustrates the processing of the smoothing policy component in one embodiment. This component implements the document similarity smoothing policy. In block 1101, the component selects the next user and query pair from the three-dimensional matrix. In decision block 1102, if all the pairs have already been selected, then the component completes, else the component continues at block 1103. In block 1103, the component selects the next non-visited page for the selected user and query pair. In decision block 1104, if all such pages have already been selected, then the component loops to block 1101 to select the next user and query pair, else the component continues at block 1105. In block 1105, the component selects the next visited page for the selected user and query pair. In decision block 1106, if all such pages have already been selected, then the component continues at block 1108, else the component continues at block 1107. In block 1107, the component increments the sum of similarities of the visited pages to the selected non-visited page and then loops to block 1105 to select the next visited page. In block 1108, the component calculates the similarity of the selected non-visited page to the visited pages and then loops to block 1103 to select the next non-visited page.

Figure 12:
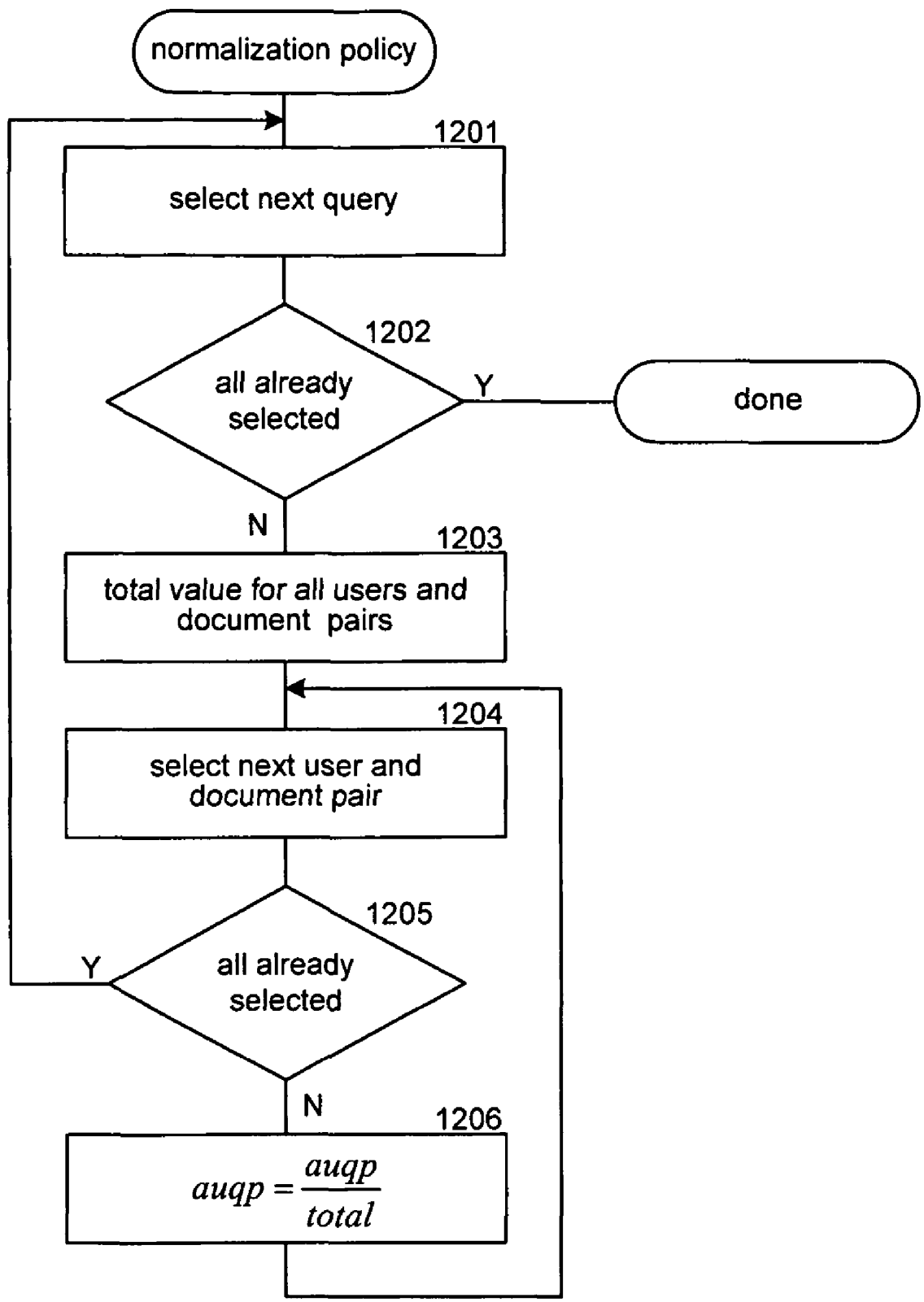
FIG. 12 is a flow diagram that illustrates the processing of the normalization policy component in one embodiment.

FIG. 12 is a flow diagram that illustrates the processing of the normalization policy component in one embodiment. The component implements normalization in the query dimension. In block 1201, the component selects the next query of the three-dimensional matrix. In decision block 1202, if all the queries have already been selected, then the component completes, else the component continues at block 1203. In block 1203, the component totals the values (weights) for all user and document pairs for the selected query. In block 1204, the component selects the next user and document pair. In decision block 1205, if all the user and document pairs have already been selected, then the component loops to block 1201 to select the next query, else the component continues at block 1206. In block 1206, the component resets the value of the fraction of the value to the total value and then loops to block 1204 to select the next user and document pair.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the augmentation system may perform augmentation of higher order tensors such as four-order or five-order when information other than user, query, and document is available. Accordingly, the invention is not limited except as by the appended claims.

We claim:

1. A method performed by a computer system with a processor and a memory for augmenting user, query, and document triplets, the method comprising:

providing in the memory triplets comprising a user, a query, and a document, a triplet indicating that the user submitted the query and then selected the document from a result of the query;

creating a three-dimensional matrix with values of the matrix based on whether the corresponding user, query, and document is in a provided triplet;

performing by the processor a three-order singular value decomposition of the three-dimensional matrix by generating unfolded two-dimensional matrices for users, queries, and documents;

performing a two-order singular value decomposition for each unfolded two-dimensional matrix, wherein a left singular matrix is generated;

selecting a reduced dimension for each left singular matrix; and generating a three-dimensional core singular value matrix by combining the left singular matrices with reduced dimensions with the three-dimensional matrix; and generating by the processor an augmented three-dimensional matrix from the three-order singular value decomposition to represent augmented user, query, and document triplets.

2. The method of claim 1 wherein the generating of the augmented three-dimensional matrix includes combining the three-dimensional core singular value matrix with the non-reduced left singular matrices.

3. The method of claim 1 including before performing the three-order singular value decomposition, applying a weighting policy to the values of the three-dimensional matrix.

4. The method of claim 3 wherein the weighting policy is selected from the group consisting of a Boolean policy, a log frequency policy, and a log inverse document frequency policy.

5. The method of claim 1 including before performing the three-order singular value decomposition, applying a smoothing policy to the values of the three-dimensional matrix.

6. The method of claim 5 wherein the smoothing policy is selected from the group consisting of a constant policy and a document similarity policy.

7. The method of claim 1 including before performing the three-order singular value decomposition, applying a normalization policy to the three-dimensional matrix.

8. The method of claim 7 wherein the normalization policy normalizes along the query dimension.

9. The method of claim 1 including before performing the three-order singular value decomposition, applying a weighting policy followed by a smoothing policy followed by a normalization policy to the three-dimensional matrix.

10. The method of claim 1 including when a user submits a query, identifying documents relevant to the query based on the values in the augmented three-dimensional matrix for that user and query.

11. A computer-readable storage medium containing instructions for controlling a computer system with a processor and a memory to augment user, query, and document triplets, by a method comprising:

providing a three-dimensional matrix of users, queries, and documents with values of the three-dimensional matrix indicating whether the corresponding user would find the corresponding document relevant to the corresponding query;

performing by the processor a three-order singular value decomposition of the three-dimensional matrix by performing a two-order singular value decomposition for unfolded two-dimensional matrices for users, queries, and documents, each unfolded matrix generated from unfolding the three-dimensional matrix in the other dimensions; and generating a three-dimensional core singular value matrix by combining the three-dimensional matrix with left singular matrices with reduced dimensions derived from a two-order singular value decomposition of the unfolded matrices; and generating by the processor an augmented three-dimensional matrix from the three-order singular value decomposition to represent the augmented user, query, and document triplets.

12. The computer-readable storage medium of claim 11 wherein the generating of the augmented three-dimensional matrix includes combining the three-dimensional core singular value matrix with the left singular matrices with non-reduced dimensions.

13. The computer-readable storage medium of claim 11 including before performing the three-order singular value decomposition, adjusting values of the three-dimensional matrix to account for variations in frequencies.

14. The computer-readable storage medium of claim 11 including before performing the three-order singular value decomposition, adjusting values based on similarity between a document that the user did visit from the query and a document that the user did not visit from the query.

15. The computer-readable storage medium of claim 11 including before performing the three-order singular value decomposition, normalizing the values in a dimension.

16. A computer system for augmenting user, query, and document triplets, comprising:

a memory storing a three-dimensional matrix of users, queries, and documents with values of the three-dimensional matrix indicating whether the corresponding user would find the corresponding document relevant to the corresponding query; and computer-executable instructions implementing a component that performs the three-order singular value decomposition by:

performing a two-order singular value decomposition for unfolded two-dimensional matrices for users, queries, and documents, each unfolded matrix generated from unfolding the three-dimensional matrix in the other dimensions; and generating a three-dimensional core singular value matrix by combining the three-dimensional matrix with left singular matrices with reduced dimensions derived from the two-order singular value decomposition; and a component that generates an augmented three-dimensional matrix from a three-order singular value decomposition of the three-dimensional matrix to represent the augmented user, query, and document triplets; and a processor for executing the computer-executable instructions stored in the memory.

17. The computer system of claim 16 wherein the generating of the augmented three-dimensional matrix includes combining the three-dimensional core singular value matrix with the left singular matrices with non-reduced dimensions.

* * * * *